June 21, 1966  C. P. DE BIASI  3,256,950
HYDRAULIC PROPULSION SYSTEM
Filed June 7, 1963  10 Sheets-Sheet 1
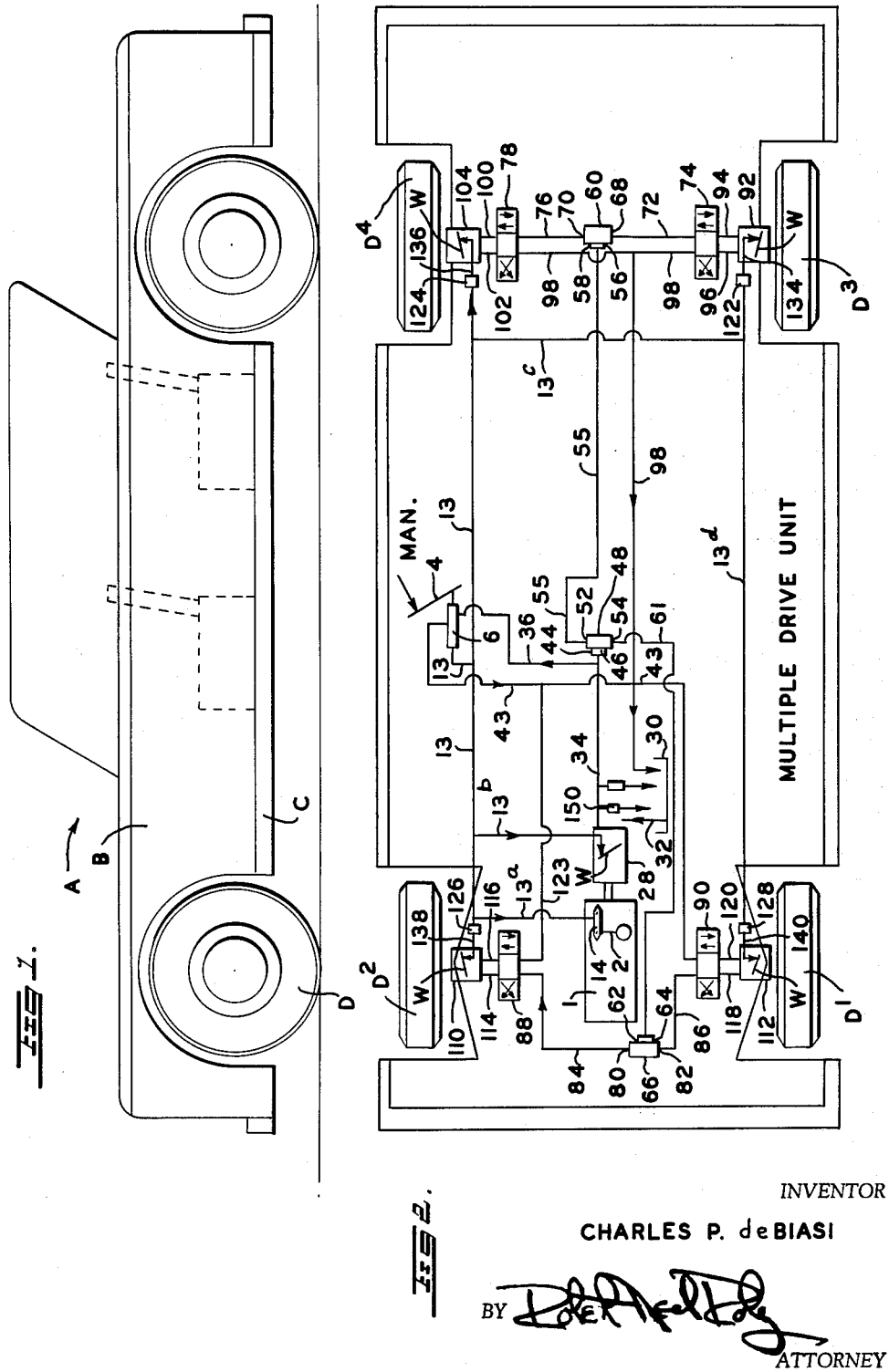
INVENTOR
CHARLES P. deBIASI
BY
ATTORNEY

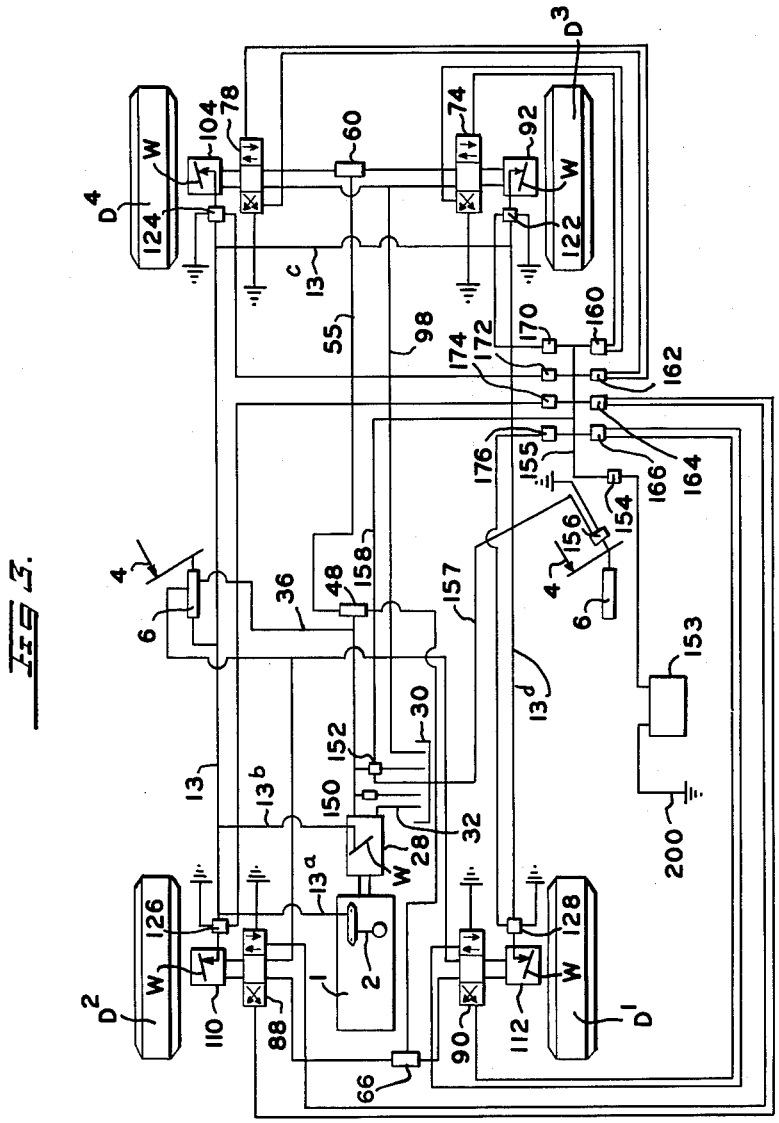

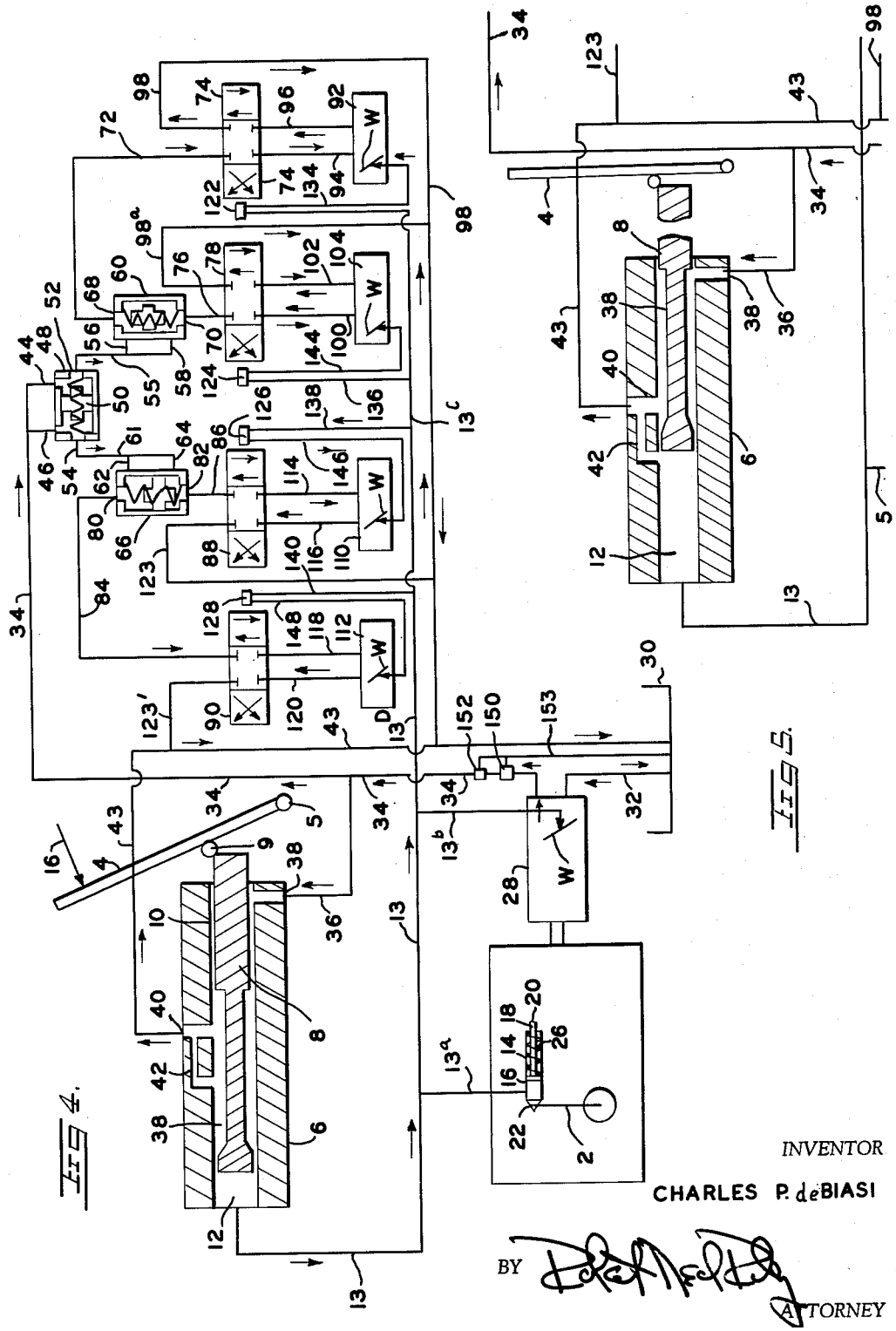

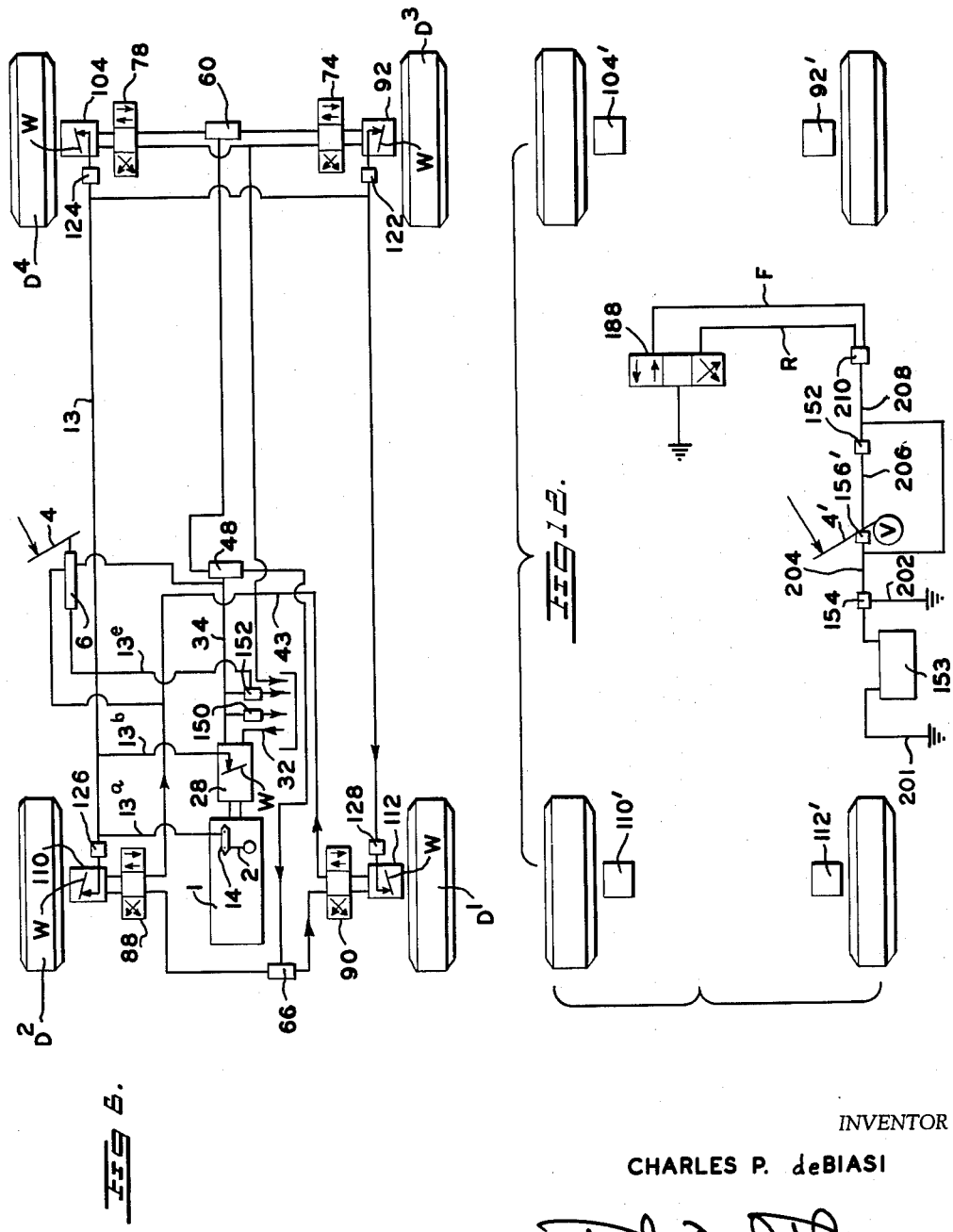

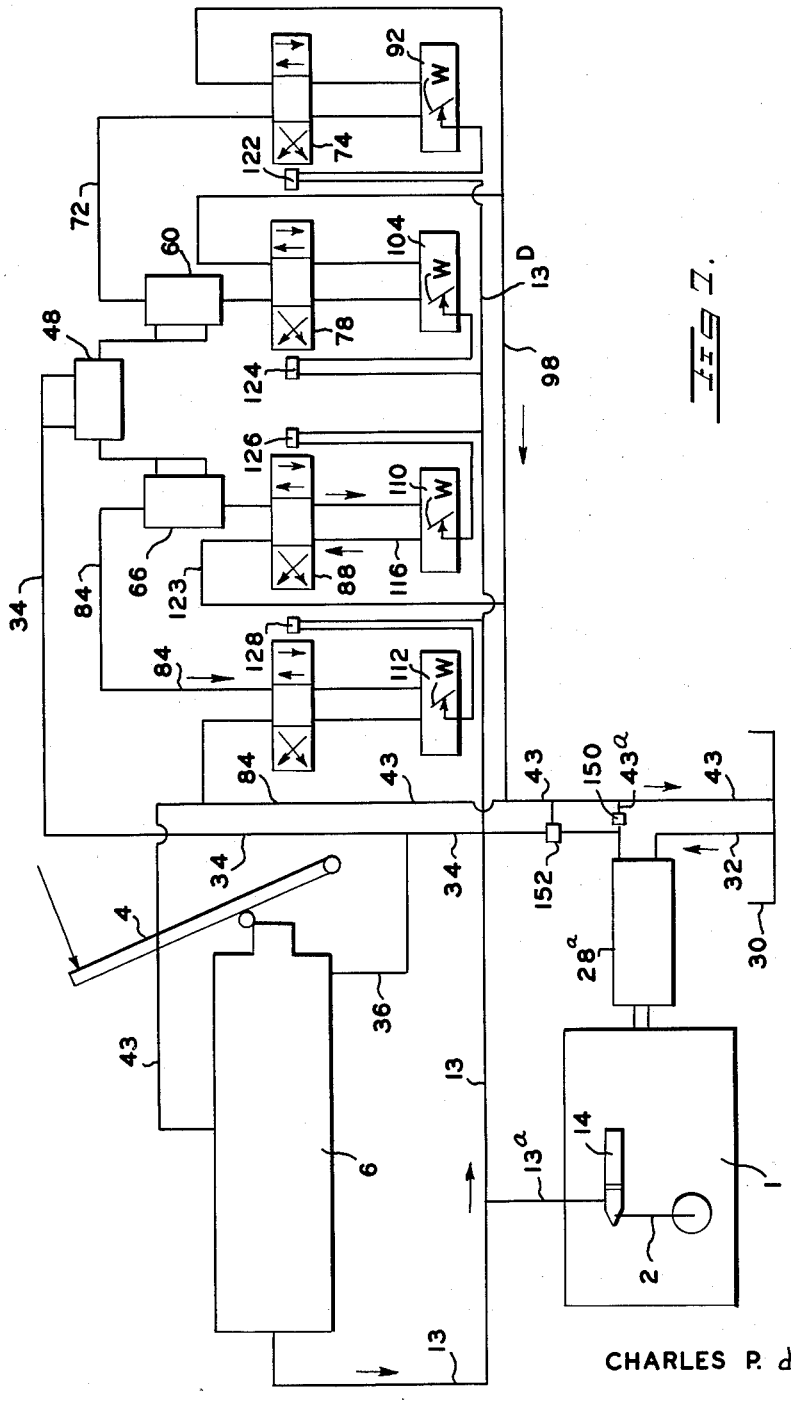

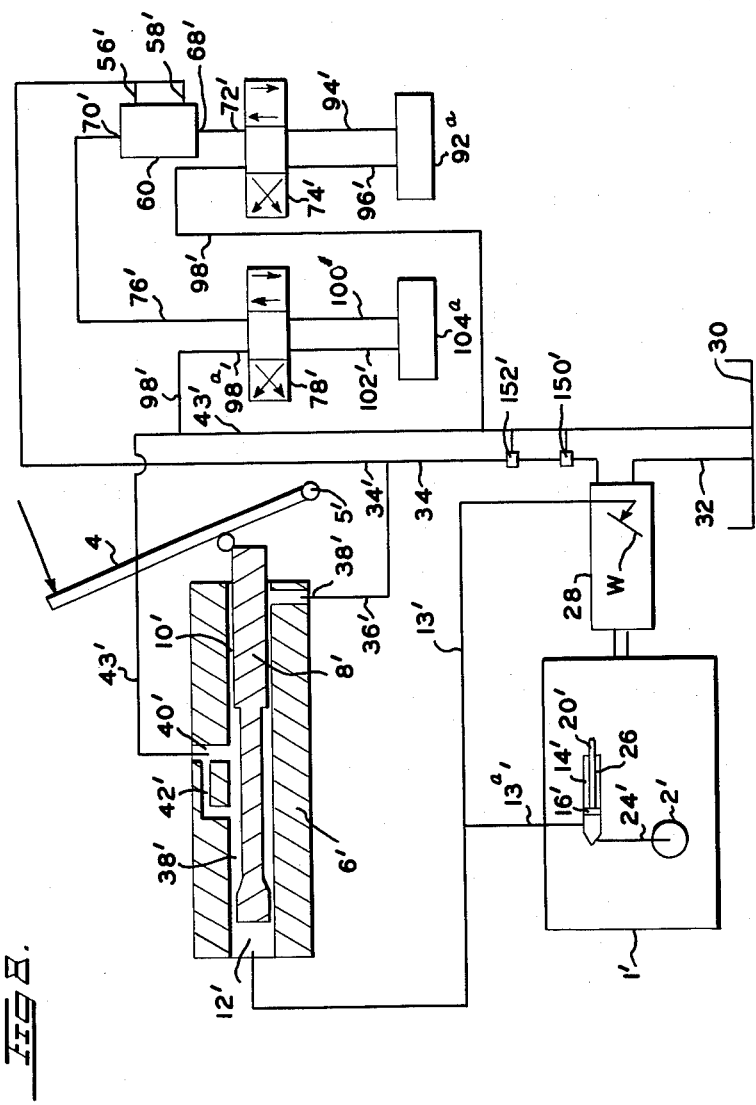

June 21, 1966     C. P. DE BIASI     3,256,950
HYDRAULIC PROPULSION SYSTEM
Filed June 7, 1963     10 Sheets-Sheet 7

INVENTOR
CHARLES P. de BIASI
BY
ATTORNEY

June 21, 1966 C. P. DE BIASI 3,256,950
HYDRAULIC PROPULSION SYSTEM
Filed June 7, 1963 10 Sheets-Sheet 8
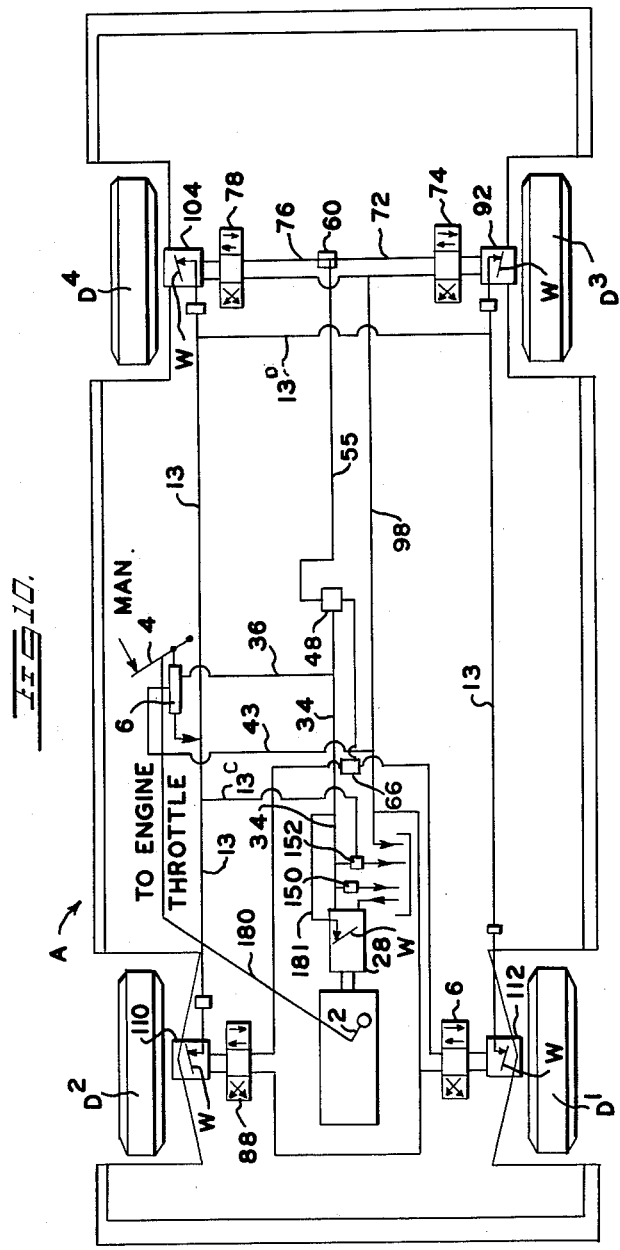
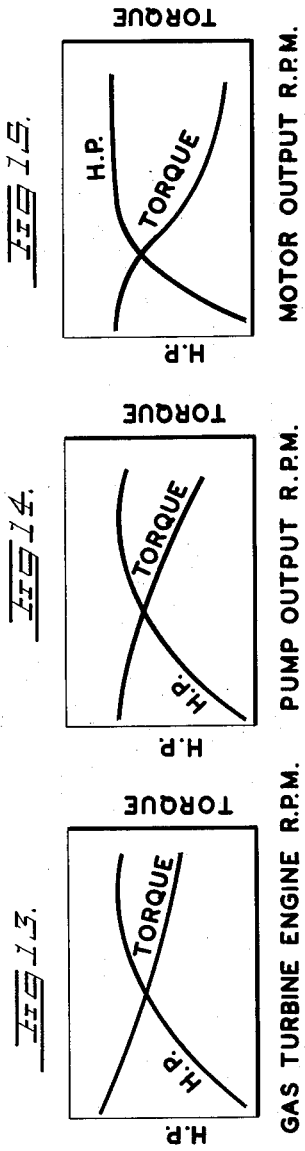
INVENTOR
CHARLES P. deBIASI
BY
ATTORNEY

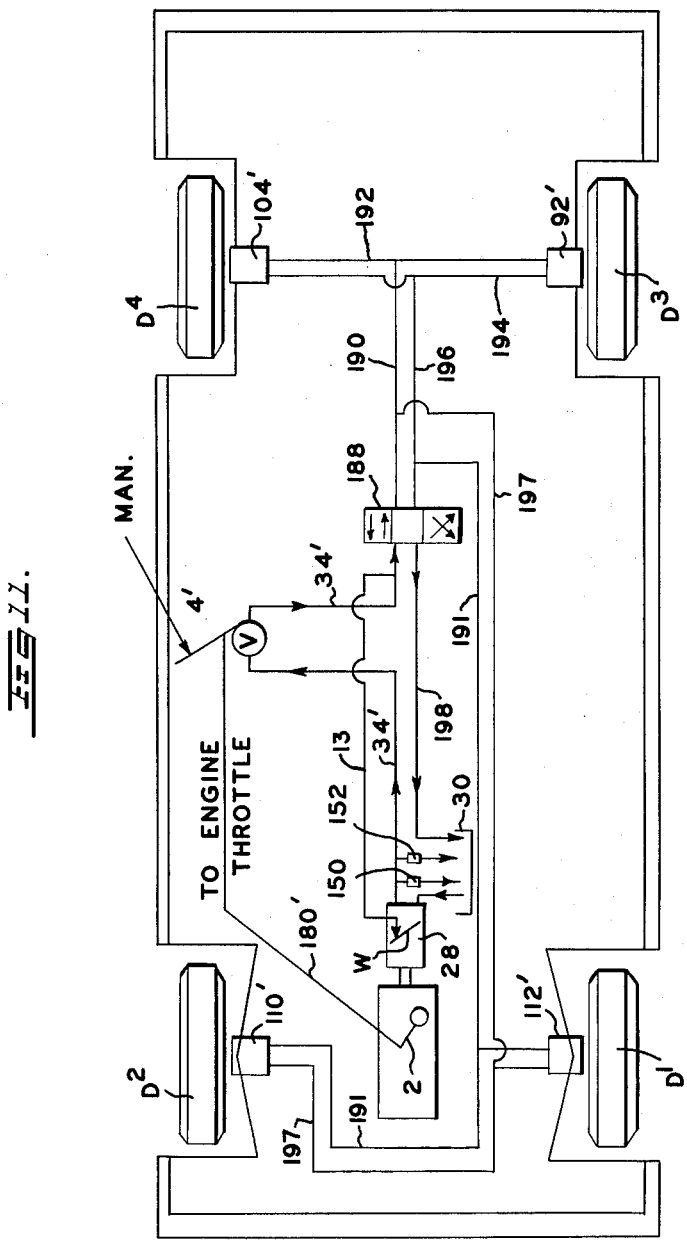

June 21, 1966          C. P. DE BIASI          3,256,950
HYDRAULIC PROPULSION SYSTEM
Filed June 7, 1963          10 Sheets-Sheet 10
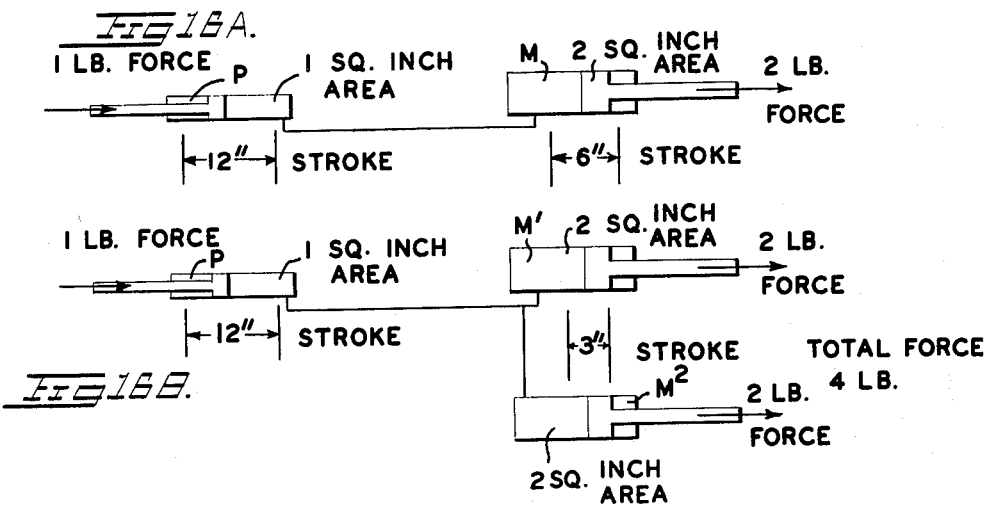
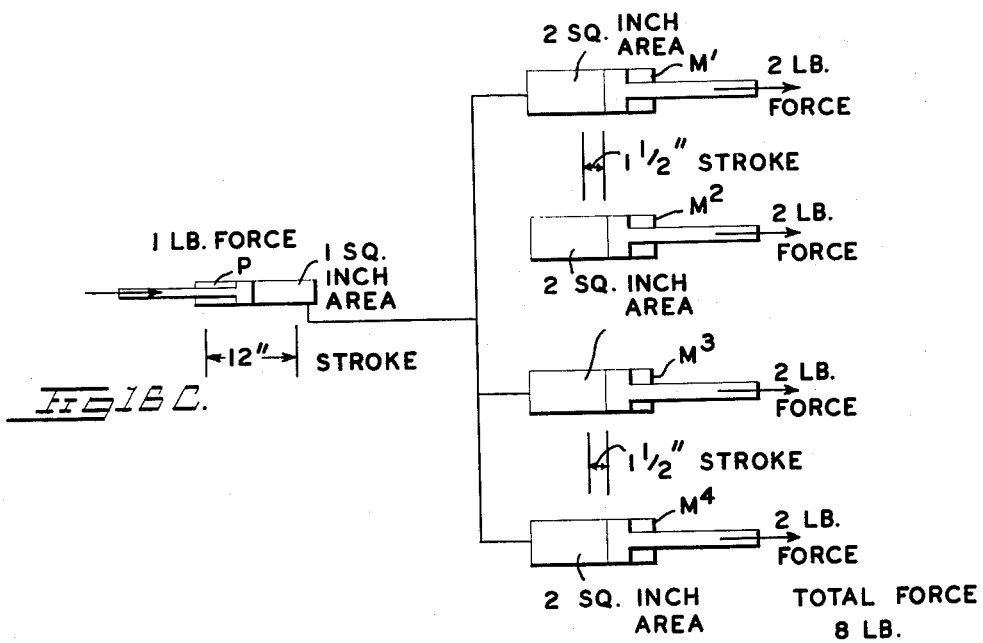
INVENTOR
CHARLES P. deBIASI
ATTORNEY

3,256,950
HYDRAULIC PROPULSION SYSTEM
Charles P. de Biasi, 74 Beaman Road, Waterford, Conn.
Filed June 7, 1963, Ser. No. 286,319
31 Claims. (Cl. 180—44)

This invention relates generally to vehicle propulsion systems and is more particularly concerned with a novel fluid transmission system, method, mechanism, arrangement, equipment or apparatus adapted for propelling powered land or water-supported vehicles of any type, whether movable on wheels, endless tracks, boat hulls, or a combination thereof.

It is therefore a primary object of the invention to disclose, describe, illustrate, and show systems, methods, mechanisms, arrangements, or apparatus for fluid pressure systems adapted for propelling a driven vehicle of any kind having driven members generally, or most of the time, in contact with a supporting medium wherein a prime mover drives a hydraulic pump and motor system at all times directly under manual control and responsive to either the pressure and/or volume of fluid flow within the system.

It is another object of the invention to disclose, describe, illustrate and show systems, methods, mechanisms, arrangements or apparatus for a fluid transmission adapted for propelling a vehicle having a power plant or engine energizing a hydraulic propulsion system incorporating driving pump and driven motor means for individually and selectively driving the driven means of the vehicle with means at all times directly under the control of the operator for controlling the speed of the engine, the pressure, flow and volume of the pressure fluid flowing in the hydraulic propulsion system.

A further object of the invention is to disclose, describe, illustrate and show fluid transmission systems, methods, mechanisms, arrangements, or apparatus for propelling a vehicle having a throttle-controlled power plant which energizes a hydraulic propulsion arrangement incorporating a hydraulic pump which drives an individual hydraulic motor operatively associated with each mobile supporting or driven unit of the vehicle wherein the volume and pressure and direction of flow of the pressure fluid pumped to the hydraulic motors is at all times directly under the control of the operator and directly responsive to the work demands of the driven motors.

It is still another object of the invention to disclose, describe, illustrate and show a fluid transmission system, method, mechanism, arrangement or apparatus for propelling a vehicle having a throttle-controlled internal combustion engine or prime mover, such as a gas turbine, driving a hydraulic propulsion system comprising variable displacement pump and motor means having manually-actuated hydraulic control means therefor and wherein the hydraulic control means simultaneously controls the throttle of the internal combustion engine and the displacement of the hydraulic fluid in the system in accordance with the energy requirements of the propulsion system.

A yet further object of the invention is to disclose, describe, illustrate and show a fluid transmission system, method, mechanism, arrangement or apparatus for propelling a vehicle having a throttle-controlled engine, gas turbine, or other prime mover driving a variable or fixed displacement hydraulic pump and individual comparable hydraulic motor units directly associated with and driving the vehicle propelling units wherein manually-actuated pressure means directly and simultaneously controls the prime mover speed, the flow, volume of the pressure fluid and/or the variable displacement of both the pump and motors in the hydraulic propulsion arrangement.

It is also a further object of the invention to disclose, illustrate and show a fluid pressure transmission system, method, mechanism, arrangement or apparatus for propelling a vehicle having a throttle-controlled power plant driving a hydraulic propulsion system comprising a variable displacement hydraulic pump of initial minimum displacement and corresponding individual variable displacement hydraulic motors directly associated with and driving each ground-engaging mobile supporting member wherein the arrangement embodies a single manually-actuated hydraulic pressure means directly and simultaneously controlling the speed of the power plant, pump and motor displacement and the effective flow of the pressure fluid in the hydraulic propulsion system.

It is still a further object to disclose, describe, illustrate and show a fluid transmisssion system, method, mechanism, arrangement or apparatus for propelling a land vehicle having a throttle-controlled engine driving a variable displacement hydraulic pump and individual fixed displacement hydraulic motors directly associated with and driving each ground-supported member wherein the system embodies a manually-actuated engine throttle control means and variable orifice means directly and simultaneously controlling the engine speed, with the pump displacement responsive to the work load on the motors.

It is yet another object of the invention to disclose, illustrate and show a fluid transmission system, method, mechanism, arrangement or apparatus for propelling a vehicle a throttle-controlled power plant driving a fixed displacement hydraulic pump and individual variable displacement hydraulic motors directly associated with and driving each mobile supporting or driven member wherein the arrangement embodies a conventional manually-operable means mechanical engine throttle control directly and simultaneously controlling the speed of the power plant and pump, the discharge of the pump being controlled by a manually operable variable orifice valve, and the displacement of the motors being controlled by the pressure demands of the driven motors.

It is still another object of the invention to disclose and illustrate a fluid transmission system, method and arrangement for hydraulically propelling a powered vehicle of any type by means of a hydraulic variable displacement pump of initial minimum or maximum displacement and individual variable displacement hydraulic motors of initial minimum adjustable displacement for each of the mobile supporting members of the vehicle wherein means are provided in the event of slippage or loss of traction by any of the individual supporting or driven members to cut off or restrict flow of hydraulic fluid to the motor or motors of such members until such traction is regained.

A yet further and additional object is to provide in a land vehicle having a hydraulic propulsion system including pump means and individual wheel driving motors a panel of switches located conveniently to the vehicle operator wherein electrical switches control the flow of hydraulic pressure fluid in the system, the directional driving control of each motor, and the selective use of one or more of the motors in the system.

Another further and additional object is to provide a hydraulic fluid propulsion system for vehicles inclusive of a variable displacement pump and a plurality of motors driven thereby for a powered vehicle having an engine wherein the volume of fluid flow and the pressure of the fluid in the system are separately controlled by operation of the accelerator pedal controlling the speed of the engine.

A yet still further and additional object of the invention is to provide in an engine-powered vehicle a hydraulic propulsion system employing a single variable displacement pump controlled by the engine accelerator means driving a plurality of variable displacement hydraulic motors with means effective to select any one or combination of the motors for vehicle propulsion at any given moment.

An additional and still further object is to provide a hydraulic pressure transmission system for an engine-powered vehicle having a single engine driven variable displacement hydraulic pump which drives individual wheel driving constant displacement motors and wherein manually operable means controlling the engine throttle means simultaneously controls the displacement and fluid flow of the pump to the wheel motors and wherein the wheel motors may be permitted or prevented to function as brakes when hydraulic fluid flow thereto is cut off.

An additional and yet still further object of the invention is to provide a hydraulic propulsion system for an engine-powered vehicle wherein the vehicle engine drives a fixed displacement hydraulic pump which in turn hydraulically drives individual vehicle wheel variable displacement motors which directly drive each wheel and wherein the engine throttle control means indirectly controls the flow and pressure of the fluid pumped to the motors while at the same time directly controlling the displacement and energy output of the individual wheel driving motors.

It is a still further and yet another object of the invention to provide in a hydraulic propulsion system arrangement or apparatus for use on a powered vehicle having individual hydraulic driving means positioned directly at each vehicle wheel, or its equivalent, wheel slippage monitoring means whereby, in the event of loss of traction at any one or a plurality of the vehicle wheels, such condition is instantly sensed and the flow of pressure fluid thereto simultaneously and automatically restricted or cut-off until wheel traction is again established.

Other objects, advantages and important features of the invention will be apparent from a study of the specification following, taken with the drawing, which together describe, disclose, illustrate and show certain embodiments, modifications, procedures and alternatives of the invention and what is now considered and believed to be the best method of practicing the principles thereof. Still other embodiments, modifications, procedures or equivalents may be subject to those having the benefit of the teaching herein and such other embodiments, modifications, procedures or equivalents are intended to be reserved especially as they fall within the scope and breadth of the subjoined claims.

In the drawing:

FIGURE 1 is a schematic showing in side elevation of one type of vehicle to which the hydraulic propulsion system may be applied.

FIGURE 2 is a diagrammatic plan view of the vehicle of FIGURE 1 with the vehicle body removed to show the application of one embodiment of the hydraulic propulsion system of the invention applied thereto.

FIGURE 3 is a diagrammatic showing of the propulsion arrangement shown in FIGURE 2 with the electrical circuitry for the various hydraulic components shown associated therewith.

FIGURE 4 is a fragmentary view of the hydraulic system of FIGURE 2 shown in part on an enlarged scale with the manually operable fluid pressure control unit thereof in an adjusted drive position.

FIGURE 5 is a fragmentary view on an enlarged scale showing the manually operable fluid pressure control unit of the hydraulic system of FIGURE 2 in neutral or non-drive position.

FIGURE 6 is a diagrammatic view, similar to FIGURE 2, of another embodiment of the invention as applied to the vehicle of FIGURE 1.

FIGURE 7 is a diagrammatic showing, similar to FIGURE 2 of another embodiment of the invention.

FIGURE 8 is a diagrammatic showing, similar to FIGURE 2, of a still further embodiment of the invention.

FIGURE 10 is a diagrammatic showing, similar to FIGURE 2, of yet another embodiment of the invention.

FIGURE 11 is a diagrammatic view, similar to FIGURE 2, of an additional embodiment of the invention.

FIGURE 12 shows the electrical system used in conjunction with the embodiment of the invention illustrated in FIGURE 11.

Figure 9:
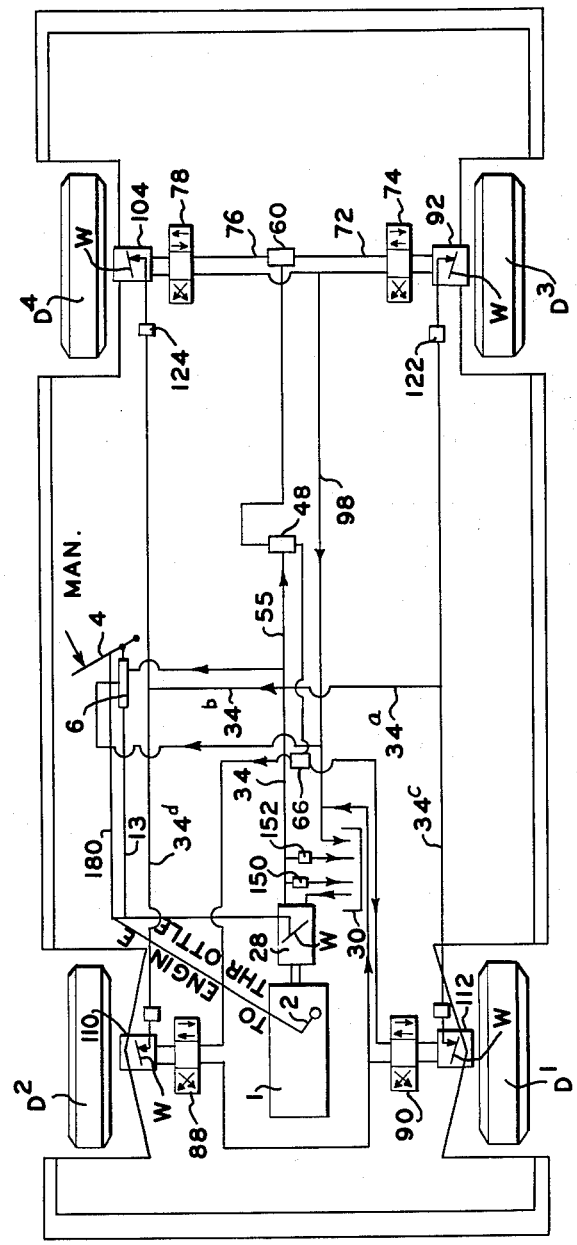
FIGURE 9 is a diagrammatic showing, similar to FIGURE 2, of a further embodiment of the invention.

FIGURES 13, 14, and 15 are graphs showing the operating characteristics of various components involved in the disclosed hydraulic propulsion systems.

FIGURES 16A, 16B and 16C variously illustrate the mechanical advantages inherent in the vehicle propulsion systems herein disclosed by applicant.

In the application of my relatively simple and inexpensive hydraulic propulsion systems to powered vehicles of any kind I have discovered that by employing a gas turbine or its equivalent as the prime mover or power source for driving the hydraulic pump, preferably a normal minimum flow variable displacement pump, I can attain all of the results attained in the use of conventional motor vehicle drives, involving with the prime mover, a clutch and variable gearing mechanism, including multi-stage gear transmissions of various kinds and differential gearing between the wheels of a given driven axle. Not only are such gearing arrangements relatively complex and bulky but they are also relatively expensive in outlay costs.

Moreover it is a well-recognized fact that not only is a conventional automotive engine of the reciprocating piston type relatively insufficient but at idling speeds it has very low torque characteristics. To offset these characteristics it is commonplace in the art to provide variable and selective step-down gearing in association with the output or driven shaft whereby high starting torque may be attained with incident power losses.

By employing a gas turbine as the prime mover it is found ideal for use with my hydraulic propulsion system. The graph shown in FIGURE 13 shows the relationship between torque and horse power output of a gas turbine in relation to engine speed. It will be noted that the turbine has relatively high torque characteristics but relatively low horsepower output at minimum or idling speeds. However, as the r.p.m. of the turbine is increased the torque slightly drops while the horsepower rapidly increases. Hence, when employed with my system the graph in FIGURE 14 shows that initially at corresponding idling speeds of the pump driven by the turbine the pump torque output is correspondingly relatively high while the horsepower output is relatively low and that the relationship between torque and horsepower output follows closely the corresponding characteristics of the turbine. In other words the torque is greatest at stall or low speeds and the horsepower output is minimum at stall or low speeds and increases with the pump output combined with response to motor demand.

FIGURE 15 shows that the torque and horsepower characteristics of the output of the hydraulic motors driven by the pump, regardless of whether the motors are of the variable displacement or fixed displacement with orifice adjustment for variable volume control, are not far different from the comparable showings in FIGURES 13 and 14.

Another aspect of my hydraulic propulsion system that I have found that renders it practical and efficient regardless of the type of vehicle and its torque demands with which the system is used is its mechanical advantage. FIGURES 16A, 16B and 16C illustrate how, with one hydraulic pump of given maximum torque or given maximum fluid pressure it is possible through the use of hydraulic motors arranged in parallel and driven by the pump, to obtain any desired driving torque for traction purposes since the torque in the wheel motors is a direct function of pump pressure.

FIGURE 16A shows schematically a pump P having a piston with a face area of one inch (square) and having a 12 inch stroke driving a motor M having a force output piston with a two square inch area and a 6 inch stroke thereby providing an output force of 2 pounds.

In FIGURE 16B the same size of pump P with the same stroke as in FIGURE 16A drives two motors $M^1$ and $M^2$ hydraulically connected in parallel and each of the same size as the motor M in FIGURE 16A. With the stroke of the pistons of motors $M^1$ and $M^2$ merely reduced to one-half, that is, 3 inches, of the motor piston of FIGURE 16A each of the two motors provides an output force of 2 pounds, or a total of 4 pounds.

In FIGURE 16C the conditions and the sizes of the units are the same as in FIGURES 16A and 16B but differ only from FIGURE 16B in that four motors $M^1$, $M^2$, $M^3$, and $M^4$ are driven each with their piston strokes reduced one-half to 1½ inches. Each motor still provides an output force of 2 pounds thereby providing a total output force of 8 pounds.

It is thus apparent that in using the propulsion system herein disclosed for multiple wheeled vehicles such as trailer trucks, road scrapers, etc., and even with multiple unit vehicles such as in train or rail-supported vehicles by providing each wheel with a driven hydraulic motor and utilizing them for starting or running purposes by selectively cutting them in or out of operation electrically, any desired degree of driving torque or traction, as well as speed, is attainable, the degree of torque being limited only by the structural strength of the components of the propulsion system.

By way of example only, the hydraulic propulsion systems herein disclosed are shown applied to an automobile of the type illustrated in FIGURE 1. It is emphasized however that the invention is applicable to any type vehicle, land or water-borne, regardless of whether the driven element or elements comprise ground-engaging wheels, endless treads or driven propellers for boats or amphibious vehicles. In FIGURE 1 is shown a land vehicle A, having an underslung platform-type chassis C preferably of hollow planar construction, supported on wheels D. A body B of any desired shape and for any desired purpose may be bolted on or otherwise secured to chassis C.

With reference to the embodiment of the hydraulic propulsion system of FIGURES 2–5 as applied to the vehicle in FIGURE 1 there is shown a prime mover 1, which preferably comprises a conventional internal combustion engine of the gas turbine type having a throttle lever 2. It is of course to be understood that the invention is intended for use broadly with various types of prime movers, and is not therefore to be construed as necessarily restricted for use with a gas turbine even though it is highly preferable for reasons hereinabove explained. The engine 1 is manually controlled by a foot or accelerator pedal 4 through the medium of a pressure control cylinder unit 6 having, as shown in FIGURES 4 and 5 a combined piston and control valve member 8 hereinafter referred to as a control piston suitably connected at 9 to pedal 4 pivoted at 5 for actuation thereby so as to be slidable in a cylinder 10 of the control unit 6 in either of two directions. Control piston 8 is slidable in the control cylinder 10 and forms a pressure chamber 12 at one end thereof, as shown, the chamber 12 being hydraulically connected by conduits 13 and 13a to one end of a cylinder 14 slidably mounted on a piston 16 having a piston rod 18 pivoted at its outer end at 20 to the body of the engine. Cylinder 14 at its free or radially outer end is pivotably connected at 22 to the outer end of the carburetor throttle lever 2. A return spring 26 is mounted in cylinder 14 between piston head 16 and the radially inner end of the cylinder.

The engine 1 directly drives through suitable coupling means a normal-minimum variable displacement pump 28 having a displacement member W the position of which is adjusted by the hydraulic pressure occurring in control pressure conduit 13 that is transmitted thereto by branch conduit 13b. The pump 28 may comprise a displacement pump having an integral fixed orifice control means with a controllable, variable displacement mechanism, wherein such mechanism is normally adjusted to provide normal minimum fluid flow characteristics. It is one of the characteristics of this type of variable displacement pump that even though its discharge outlet may be maintained closed while being driven in normal minimum displacement adjustment without any adverse effect on the driving means therefor, nevertheless, as soon as its discharge outlet is opened it automatically produces and maintains a minimum discharge of fluid therefrom as long as it remains driven and will not produce any fluid pressure until it receives pressure demand from a motor through the pressure control conduit 13.

A reservoir 30 for supplying hydraulic fluid is connected to the intake side of the pump 28 by a conduit means 32. A pressure fluid conduit means 34, extending from the outlet side of the pump 28, has a branch conduit 36 which connects to the fluid inlet 38 of cylinder bore 10 of the control unit 6 near its end adjacent pedal 4. The flow of pressure fluid in conduit 36 to cylinder 10 is controlled by the position of the control piston in the control unit 6.

The pressure fluid conduit 34 extends beyond its branch portion 36 and connects at 44 and 46 to the inlet passages at opposite sides of a spring-balanced, pressure-actuated, directional flow control valve 48 hereinafter referred to as a "denier" valve 48, disclosed in greater detail in my patent application Serial No. 23,192, filed Oct. 17, 1962. The denier valve 48 has a slidable, spring balanced piston or plunger valve element which controls fluid flow through the respective denier valve outlet passages 52 and 54 in a manner and for a purpose to be later described. One outlet 52 of the valve 48 is connected by means of conduits 55, 56 and 58 to the opposite sides of another denier valve 60 corresponding identically to valve 48. In like manner the other outlet 54 of the denier valve 48 is connected by conduits 61, 62 and 64 to the opposite sides of another denier valve 66 identical in structure to denier valves 48 and 60.

One pressure fluid outlet 68 of the denier valve 60 is connected by pressure conduit 72 to the inlet of a remotely controlled solenoid-actuated 4-way close-center valve 74, which controls the direction of fluid flow to a hydraulic normally minimum flow, variable displacement driving motor 92 while the other pressure fluid outlet 70 is correspondingly connected by conduit 76 to the inlet of a similar 4-way valve 78 correspondingly controlling flow to another corresponding hydraulic motor 104. Outlets 80 and 82 of denier valve 66 are likewise connected, respectively, by conduits 84 and 86, to the inlets of like 4-way valves 88 and 90. The directional flow 4-way valve 74 connects pressure fluid line 72 to the preferably built-in variable displacement motor 92 of the vehicle rear wheel D3, by either of two conduits 94 and 96 depending on the controlled direction of fluid flow through the 4-way valve 74. If, with a given flow-setting of the 4-way valve, fluid flows to the motor 92 via conduit 94, the conduit 96 will then function as a return-flow conduit to the 4-way valve 74 and conduit 98 connected to pressure fluid reservoir 30. In identically the same manner, conduits 100 and 102 connect the similarly actuated 4-way valve 78 to the other vehicle rear wheel variable displacement driving motor 104 of the other rear wheel D4 of the vehicle, the return flow conduit 98 likewise connecting valve 78 of the reservoir 30. Correspondingly, the solenoid-actuated 4-way valves 88 and 90 control the direction of fluid flow to the respective vehicle front wheel variable displacement driving motors 110 and 112 of the respective front wheels D2, D1 of the vehicle, the fluid conduits 114, 116 and 118, 120 connecting motors 110 and 112 to their respective 4-way valves 88 and 90 which are identical in construction and operation to valves 74 and 78 in the rear wheel driving arrangement. Return flow conduits 123 and 123' from the valves 88 and 90 connect with return flow conduits 43 and 98 and hence to the reservoir 30.

Solenoid-actuated open-close orifice type valves 122, 124, 126 and 128, respectively, permit flow to or cut off flow of pressure fluid from control unit 6 to the wobble control structure W of each of the vehicle wheel driving motors for adjustment thereof. As shown, cut-off valve 122 is connected to conduit 13d which in turn is hydraulically connected through conduit 13c to pressure control conduit 13 while conduit 134 connects valve 122 to the wobble control structure W of the motor 92. Correspondingly, conduits 136, 138 and 140 respectively connect valves 124, 126 and 128 to the pressure control fluid conduits 13 and 13d while conduits 144, 146 and 148 connect the respective valves 124, 126 and 128 with the wobble control structures W of the other three vehicle wheel-driving hydraulic motors 104, 110 and 112.

To protect the hydraulic system generally a primary safety excess-pressure relief valve 150 and a primary solenoid closed, spring-opened orifice valve 152 are mounted in series in the pressure fluid conduit 34 and preferably positioned relatively close to the pressure fluid pump 28. Both valves 150 and 152 are connected to reservoir 30 by means of conduit 153, the valve 150 being positioned intermediate valve 152 and the reservoir.

Referring now to FIGURE 3, which diagrammatically shows the electrical conditioning and control features forming a part of the hydraulic propulsion system, the engine conventional battery 153 is shown connected between a ground connection and the engine ignition switch 154. Shown connected to ignition switch 154 in parallel through electrical lead 155 are four double-throw switches 160, 162, 164 and 166 connected, through electrical leads 155 to lead of the solenoids (not shown) actuating the 4-way directional flow control valves 74, 78, 88 and 90 for each of the wheel driving motors 92, 104, 110 and 112. The four double-throw switches 160–166 each having a neutral center position may be of the type disclosed in the U.S. patents to Baumgardner, 2,413,135, and Mason, 2,831,082, by way of example. When their control elements are moved forwardly they would adjust the solenoid directional flow valves for forward drive and, when moved rearwardly they would adjust the directional flow valves for reverse drive. Also connected to lead 155 in parallel are four single pole switches 170, 172, 174 and 176 each connected respectively to the openclose wheel motor orifice valves 122, 124, 126 and 128. The switch 156, mounted in association with the accelerator pedal 4, is connected by lead 157 to the solenoid of the hydraulic system's bypass valve 152, another leads 158 extending from the solenoid thereof to electrical lead 155.

To enable the operator to conveniently and instantly control the flow of pressure fluid through the propulsion system as desired the four directional flow controlling switches 160, 162, 164 and 166 together with the four single pole switches 170, 172, 174 and 176 controlling the control-pressure orifice valves 122, 124, 126 and 128 of the wheel motors are mounted on a panel (not shown) adjacent the operator's location, such as the conventional driver's compartment, on the vehicle.

The operation of the vehicle propulsion system hereinafore described is believed to be now readily apparent. Assuming the vehicle stationary and the gas turbine engine 1 not running the operator turns on the engine ignition switch 154 for starting the engine 1 thereby at the same time, as apparent from FIGURE 3, energizing the circuits controlled by switches 160–166 and 170–176. If a forward high torque 4-wheel drive is desired he then moves forwardly the control elements of all four double-throw switches 160, 162, 164 and 166 thereby setting the solenoid-actuated directional flow valves 74, 78, 88 and 90 for forward drive of the wheels D1–D4 by their respective hydraulic motors. At the same time he also actuates single pole switches 170, 172, 174 and 176 which open the solenoid-controlled orifice valves 122, 124, 126 and 128, thereby opening the control pressure lines 13 and 13d to the displacement control mechanisms W of all the wheel motors 92, 104, 110 and 112. However, the vehicle remains stationary since the system bypass valve 152 remains open and the small output flow of fluid that obtains from the pump 28 as above explained merely flows through the valve 152 to reservoir 30. This is the condition that obtains as indicated in FIGURE 5. It will be noted in this figure that control piston 8 remains in its normal unactuated position. At such time the small fluid flow in discharge conduit 34 from pump 28 flows through branch conduit 36 to inlet 38 of the control cylinder 6 thence through the necked-down portion 38 of the piston 8 to outlet 40 of the cylinder and thence to reservoir 30 via return conduit 43. This arrangement also provides for removal of any air entrapped in the hydraulic fluid of the system since any air in conduit 13 and its associated branch conduits escapes from the chamber 12 in unit 6 via duct 42 to outlet duct 40 therefrom to the reservoir return conduit 43 as will air entrapped in the pump discharge conduit 34.

The operator now depresses the foot or accelerator pedal 4 thereby actuating switch 156 to close the bypass orifice valve 152. Simultaneously the depression of pedal 4 moves piston 8 in the control unit 6 to a position such as that shown in FIGURE 4, for example, which builds up pressure in control pressure conduits 13, 13a, 13b, 13c, and 13d in proportion to depression of the pedal to thereby move the throttle cylinder 14 on its piston 16 to actuate the engine throttle 2 and simultaneously proportionately move the displacement mechanisms W of the pump 28 and motors 92, 104, 110 and 112. Accordingly the pump 28 now pumps hydraulic fluid under pressure into its outlet pressure fluid conduit 34 and since bypass orifice valve 152 is now closed the pressure fluid flows through the distributor or denier valves 60 and 66 and the 4-way directional flow valves 74, 78, 88 and 90 to the wheel motors 92, 104, 110 and 112. Since the displacement mechanisms in these motors at this time have been moved, as stated, by the pressure in conduits 13–13d from a minimum to some positive displacement position they then respond to the pressure of the fluid from pump 28 as determined by the setting of its displacement structure W to rotate the vehicle wheels D1–D4. If the operator now further depresses the foot pedal 4 the increased pressure in conduit 13 acts through conduit 13a to increase the r.p.m. of the engine and simultaneously through conduits 13b, 13c, and 13d to further positively displace the displacement mechanisms of the pump 28 and wheel motors.

Assuming that while the vehicle is being driven either in forward or reverse that one or both of either the front or rear vehicle wheels lose traction due to slippage occasioned by ice, water, leaves, etc., thereby causing a drop in fluid pressure to the motors of the slipping wheels. The resulting pressure differential acting at the inlets 44 and 46 of denier valve 48 displaces the spring-balanced piston of the valve in one direction or the other to restrict or cut off pressure fluid flow through one or the other of its outlets to one or both of the motors of that set of wheels which is slipping.

Since it is highly desirable to limit the flow of pressure fluid solely to the particular wheel which may have lost traction under the conditions above stated the additional denier valves 60 and 66 are provided. As indicated in FIGURE 4 it is assumed, for example, that only the front vehicle wheel driven by motor 110 has lost traction, while the vehicle is driven forwardly, and has started to spin. The resulting drop in hydraulic pressure in the motor 110 permits a surge in the flow of pressure fluid in conduits 86 and 114 thereto which has caused the pressure fluid from pump 28 acting through the inlet 62 to the higher side of valve 66 to thrust the spring-balanced piston valve thereof into the flow obturating position shown relative to pressure conduits 86 and 114 to the wheel driving motor 110 thereby cutting off flow of pressure fluid thereto, except for a predetermined minimum of small flow past the piston valve, to the motor. The reason for maintaining a minimum flow is that when the slipping wheel regains traction, the pressure of the fluid on its side of the denier valve can then build up to become equal to that obtaining on the side toward the pump and thereby allow the plunger positioning springs to move the flow controlling valve plunger to its neutral centered position. Meanwhile, the other three motors driving the wheels having normal traction receive the fluid from pump 28 substantially at the pump outlet pressure since the denier valve 66 would function similarly if the wheel driven by motor 112 lost traction; however, it is obvious that this condition would cause the spring-balanced valve element of the denier valve 66 to move in the opposite direction to variably restrict the outlet 80 thereof depending on the degree of slippage of the wheel.

It is believed obvious from the foregoing explanation that the provision of the three denier valves 48, 60 and 66 not only substantially isolates the driving motors at either the rear or forward ends of the vehicle if both wheels at either end lose traction due to slippage but they further discriminate between either of the two driving wheels at either end of the vehicle to restrict flow of pressure fluid to only the motor of the particular wheel that has lost traction.

By providing the four double-throw switches 160, 162, 164 and 166 in the control panel in the operator's cab of the vehicle, for controlling the direction of flow of the pressure fluid in the entire hydraulic system, the operator can if he desires operate only one switch and thereby drive only one of the driven wheel motors in either forward or reverse in the manner above described. If he desires only a 2-rear wheel drive to obtain he merely flips switches 160 and 162 in the direction in which he desires and vehicle to be driven. Correspondingly, only switches 164 and 166 are operated if only a 2-front wheel drive is desired. For a 4-wheel drive all four switches are operated. For the 2-rear or 2-front wheel drive the denier valves 60 and 66 respectively control flow of pressure fluid between the two wheel motors at the rear or front of the vehicle in the event of wheel slippage in manner described. Moreover, it is obvious that by setting one or both of the switches 166 and 160 for the respective motors of wheels D1 and D3 on one side of the vehicle for forward drive, for example, and one or both of the switches 164 and 162 for the respective motors of wheels D2 and D4 on the opposite side of the vehicle in either neutral position or reverse drive position sharp turning steering characteristics are available.

In the embodiment of the invention disclosed in FIGURES 2 through 5 the engine throttle and the displacement mechanisms of the pump and wheel motors are all directly responsive to the fluid pressure developed in accordance with the degree of actuation of the manually operable pressure control unit 6. Hence the system of these figures is responsive solely to pedal fluid pressure when the systems bypass valve 152 is closed electrically by actuation of switch 156 also controlled by the panel 4.

In the modification shown in FIGURE 6, wherein parts conforming identically to like parts in FIGURES 2–5 are identified by the same reference numerals, the pressure control conduit 13 from the manually operable control pressure unit 6 has an additional branch conduit 13e extending to the primary bypass valve 152 of the system whereby the closing of this valve is made directly responsive to the fluid pressure manually created in control unit 6 by the foot pedal 4 rather than electrically as in the preceding embodiment. Accordingly, the speed of the engine and the displacement of the initial minimum displacement of the pump and wheel motor displacement mechanisms W are directly responsive to the pressure in manually actuated unit 6. In the electrical system shown in FIGURE 3 the only difference involved would be the omission or disconnecting of switch 156 from the battery circuit. The operation of the propulsion system of this embodiment in all other respects is the same as in the preceding embodiment. However, with a constant speed setting of the engine by pedal 4 the pressure in the pump discharge conduit 34 can vary depending on the road conditions encountered by the vehicle. In other words, if the driving load on the wheel motors 92, 104, 110 and 112 becomes relatively light the speed of the engine will increase without any change in the setting of pedal 4. This results in a greater rate of flow of fluid in the pump discharge conduit 34 and consequently its effect on the wheel motors will result in a corresponding increase in vehicle speed. This provides a type of driving reaction or "feel" to the operator in operating the accelerator or control pedal 4 similar to that experienced in conventional mechanical vehicle transmission systems.

Under certain conditions it is desirable to employ a hydraulic propulsion system wherein a fixed displacement pump drives variable displacement hydraulic motors for the vehicle wheels with substantially the same type of system control as disclosed with respect to the above described arrangement in FIGURES 2–5 with one further slight difference, as regards the system solenoid-actuated bypass valve 152 and excess pressure relief valve 150, wherein these valves are connected in parallel rather than in series with each other between pump discharge conduit 34 and the reservoir return conduit 43. Such an arrangement is shown in FIGURE 7. Here, as indicated, pump 28a is of the fixed displacement type and may comprise a conventional piston or vane type pump.

The operation of the propulsion arrangement of FIGURE 7 is generally similar to that of FIGURES 2–5 except that the rate of discharge of pump 28a is responsive solely to the speed of the engine and therefore only indirectly to the pressure of the fluid in the manually operated pressure unit 6. Moreover, by providing the parallel connection arrangement of the bypass and excess pressure-release valves 152 and 150, respectively, damage to the system is prevented should the bypass valve 152 be closed by a sudden and un-intentional large depression of the foot pedal 4 while the wheel motors 92, 104, 110 and 112 are under exceedingly heavy loading. The sudden acceleration of the engine by the actuation of its throttle 2 by the pedal 4 and resulting suddenly created high pressure in the pump 28a would be shunted from pump 28a via value 150 and the shunt conduit 43a direct to the reservoir 30.

FIGURE 8 shows another embodiment similar in many respects to the propulsion system disclosed in FIGURES 2 and 7. However, in FIGURE 8 the system is limited to a 2-wheel drive for use on vehicles, such as passenger cars, bulldozers, tractors, etc., wherein the two wheel motors 92a and 104a which are of the fixed displacement type, function as brake devices for the vehicle wheels when the flow of pressure fluid to them is reduced or cut off by the movement of the displacement mechanism W of the pump 28 towards neutral by reduction of foot pressure on pedal 4. Further, since the system applies only a 2-wheel drive only the single denier valve 60 is provided therein and the two panel switches 164 and 166 of the FIGURE 3 electrical circuit obviously are omitted. Also the switches 170, 172, 174, 176 and the solenoids 122, 124, 126 and 128 would all be omitted since the motors are fixed displacement motors. The circuit in all other respects would be the same.

It is to be noted that while a single or common hydraulic fluid flow controlling switch may be used if desired for unitary and simultaneous directional control of the two wheel driving motors the provision of the two separate control switches in this embodiment is particularly appropriate for use with an endless track vehicle for the reason that the oppositely or laterally positioned endless track units may be simultaneously driven in the same or in opposite directions, or one track may be driven in either direction while the other track is held stationary by not being driven at all, the separate flow-controlling switch therefor being at such time maintained in neutral.

The operation of the embodiment disclosed in FIGURE 8 is believed to be obvious particularly in view of the explanation above with respect to the first-disclosed embodiment. With either of the toggle switches 160, 162 set for drive in a given direction the accelerator pedal 4 is depressed to the position for example illustrated in FIGURE 8 with piston valve 8 moved to the position shown. The fluid pressure created in pressure chamber 12 of control cylinder unit 6 via conduit 13 moves the throttle lever 2 of the engine to increase the engine speed. Simultaneously, the fluid under pressure in conduit 13 adjusts the displacement mechanism W of the hydraulic pump 28 to cause a positive displacement of pressure fluid from reservoir 30 and intake conduit 32 into pressure conduit 34 past the pressure-release valve 150 and past the cut-off valve 152 opened by switch 156. Flow of pressure fluid passes by way of denier valve 60 through conduits 72' and 76' to the the 4-way valves 74' and 78' and thence by conduits 94' and 100' (if the control switches are both set for forward drive) to the constant displacement wheel driving motors 92a and 104a. Return flow to reservoir 30 of hydraulic fluid from the motors obtains by way of conduits 96', 102', 98', 98a' and 43'. In the event of excessive pressure being developed within the pressure fluid conduits 150 will open and bypass the pressure fluid to reservoir 30 until such time that the conditions causing the excessive pressure are eliminated.

With the system shown in FIGURE 8, should the vehicle be descending a relatively steep grade with the control pedal returned to its uppermost or engine-idling position, by conventional spring means or the like, the wheel driving motors 92a, 104a will then, due to the inertia of the vehicle, be driven by the vehicle wheels to then function as brake pumps to provide a braking action on the vehicle. With the control switches 160, 162 adjusted to their neutral or centered position the wheel motors would then lock the wheels and hold the vehicle against any movement.

FIGURE 9 discloses another embodiment of the invention wherein the engine throttle 2 is mechanically linked at 180 to the accelerator pedal 4 for operation thereby independently of the fluid pressure system while the fluid pressure of the control pressure unit 6, also operated by the foot pedal 4, actuates and controls the displacement mechanism W of the normal minimum variable displacement pump 28. Connected to pump discharge conduit 34 are two branch conduits 34a and 34b; conduit 34a being connected to a control pressure conduit 34c connected to the displacement mechanisms W of both wheel motors 92 and 112 while conduit 34b is connected to a control pressure conduit 34d connected to the displacement mechanisms W of both of wheel motors 104 and 110. Likewise, the electrically controlled close-open valves, such as valves 122, 124, 126 and 128 of FIGURE 2, for selectively cutting in or out the wheel motors 92, 104, 110 and 112, respectively, are also intended to be present.

The electrical control system shown in FIGURE 3 is directly applicable to and used with this propulsion arrangement.

In the operation of this embodiment, with the accelerator or foot pedal 4 mechanically and directly linked to the engine throttle 2 greater flexibility is provided for obtaining a different rate of throttle movement with respect to the operation of the pump and motor displacement mechanisms, if desired.

Moreover, by having the motor displacement mechanisms directly responsive to the delivery or output pressure of the pump 28 rather than only indirectly as in the propulsion arrangement of FIGURE 2 a more direct correlation between the pressures within the pump and motors is attained.

FIGURE 10 illustrates an embodiment wherein, like in the embodiment precedingly described, the engine throttle 2 is connected directly to the accelerator pedal 4 by a conventional mechanical throttle control linkage 180 while the fluid pressure from control pressure unit 6 also actuated by foot pedal 4 directly actuates the variable displacement mechanisms of the wheel motors 92, 104, 110 and 112. In this embodiment the pressurized fluid from control pressure unit 6, actuated by accelerator pedal 4, flows directly to and controls the setting of the normal minimum variable displacement mechanisms W of the wheel motors by means of the conduits 13, 13c and 13d. As in FIGURE 6 branch conduit 13c connects orifice valve 152 to conduit 13 whereby the normally spring-opened orifice dump valve 152 is closable by the fluid pressure manually created in control unit 6.

Connected to the discharge pressure conduit 34 of the pump 28 downstream from orifice valve 152 is a branch conduit 181 which extends to the normally minimum flow, variable displacement mechanism W of the pump whereby the discharge fluid pressure of the pump adjusts its own displacement mechanism as a direct function of the motor demand. As in the preceding embodiments it is intended that this embodiment will include the directional flow valves as well as the electrically controlled selective and denier valves for the wheel motors that are omitted merely for the sake of simplicity and undue repetition. The electrical control system of FIGURE 3 likewise applies to this embodiment with the exception of the omission of switch 156 and its connections to pedal 4 and the orifice dump valve 152 of the system.

In the operation of the propulsion system of FIGURE 10 the operator starts the gas turbine or engine 1 by means of the ignition switch 154 of FIGURE 3. At this time the orifice dump valve 152 is open and the minimum fluid flow from the pump 28 flows to reservoir 30. Assuming forward travel is desired with all four wheel motors 92, 104, 110 and 112 driving, the operator actuates switches 160, 162, 164 and 166 to forward travel positions and also single pole switches 170, 172, 174 and 176 to open flow of displacement control fluid pressure to the wheel motors. The operator now depresses the accelerator pedal thereby simultaneously closing the dump orifice valve 152 and adjusting the displacement mechanism W of the motors 92, 104, 110 and 112 by the fluid pressure created in control unit 6. At the same time the operator, by depressing pedal 4 actuates the engine throttle through linkage 180 to increase the engine r.p.m. thereby causing fluid flow from the pump 28 to drive the vehicle forwardly. At the same time the discharged pressure fluid from the pump 28 in conduit 34 reacts back through branch conduit 181 to adjust the pump displacement mechanism W to conform to the fluid pressure loading on the wheel motors 92, 104, 110 and 112 which directly responds to the load demands of the motors.

As the operator increases his pressure on the foot pedal 4 the motor wobble mechanisms W will assume greater displacement positions whereby the torque values of the motors decrease simultaneously with an increase of their horse-power output, a condition which is essential and desirable. The engine speed will also increase as does its horsepower. Meanwhile, the pressure of pump 28 is responding to the demand of the wheel motors and as the engine speed increases volume of the fluid discharge of the pump 28 increases as does the horsepower of the pump. If the operator removes all pressure from foot pedal 4 the engine 1 returns to the idling speed for which it has been set; the system orifice dump valve 152 opens whereby the fluid in the system is reduced to atmospheric pressure and the vehicle thus returns to a "free-wheel" condition.

FIGURE 11 in conjunction with FIGURE 12 illustrates a somewhat similar modification of the invention applied to the vehicle of FIGURE 1. In the embodiment shown in FIGURE 11 the hydraulic system is under direct volume control of the pressure fluid flow whereas in all of the previously described embodiments the systems were solely under fluid pressure control.

With particular reference to FIGURE 11 the accelerator or foot pedal 4' is pivoted about the axis of a rotary valve V and connected to the engine throttle 2 by a conventional mechanical linkage 180', the pedal 4' being arranged to simultaneously actuate the valve V which is a variable orifice, volume control valve normally closed when pedal 4 is in its un-actuated, engine idle position as illustrated. Valve V is mounted in the pressure flow discharge conduit 34' of the minimum flow, variable displacement pump 28 which is preferably driven direct from the gas turbine or engine 1 as in the previously described arrangements. From valve V the pump measure fluid discharge conduit 34' connects with a solenoid-controlled 4-way directional or reversing fluid flow valve 188. Intermediate the control valve V and the valve 188 a pressure control bypass conduit 13 is connected therewith and extends to the displacement control mechanism W of the pump 28 to hydraulically position it in a manner to be described. A pressure fluid conduit 192 is connected between the two rear fixed displacement bi-rotational wheel motors 92' and 104'. Another conduit 194 extends between these wheel motors 92 and 104 and is connected to valve 188. Pressure fluid conduits 191 and 197 extend between front wheel motors 110 and 112 and are connected respectively to pressure conduits 190 and 196 intermediate valve 188 and the rear wheel conduits 192 and 194. Either of the conduits 190, 196 may comprise the pressure fluid flow line to the wheel motors depending on the setting of the valve 188 for forward or reverse drive. A return flow conduit 198 connects valve 188 with reservoir 30. The normally spring-opened, solenoid-closed bypass or dump valve 152, along with the excess pressure release valve 150, is connected to the pressure fluid discharge conduit 34' just downstream of the pump 28 as in the previously described embodiments.

With reference to the electrical control features of FIGURE 12 with respect to the hydraulic system of FIGURE 11, the conventional storage battery is shown at 153 having a ground connection 201 to one of its terminals, the other terminal being connected to the conventional ignition switch 154 which in turn has a ground connection 202. A conductor 204 connects the ignition switch 154 with the master switch 156' which is energized by foot pedal 4' when initially manually depressed. Energization of master switch 156', as in the embodiment of FIGURES 2 and 3, energizes via wire 206, the solenoid of the spring-opened, solenoid-closed orifice bypass or dump valve 152 of the hydraulic system. When the solenoid of valve 152 is energized electrical current flows via wire 208 to a double throw, single pole switch 210 the control element of which when moved forwardly relative to the vehicle energizes the solenoid of the reversing flow valve 188 via conductor wire F. When the control element of switch 210 is reversely moved from neutral it correspondingly energizes the valve solenoid via conductor wire R to effect a reversal of fluid flow through the valve 188.

In the operation of the propulsion system of FIGURES 11 and 12 the operator starts engine 1 by means of its ignition switch 154. With the pedal 4' in the position shown and the engine now running at idling speed and driving pump 28 no propulsion of the vehicle obtains since the solenoid-controlled dump valve 152 of the hydraulic system remains open and the small pressure fluid flow from the pump in its initial minimum flow adjustment passes through valve 152 to reservoir 30.

Assuming forward drive is desired the operator actuates switch 210 to its forward drive position thereby connecting the solenoid of the fluid flow reversing valve 188 with electrical conductor 208 via conductor F. With the engine idling the operator now initially depresses foot pedal 4'. This initial movement of the pedal not only actuates the master switch 156 to cause the closure of the bypass valve 152 and direct the pressure fluid in the pump discharge conduit 34' towards the now slightly opened valve V but it also simultaneously increases the opening of valve V whereby the volume of the fluid discharged from the pump is corresponding increased thereby effecting greater motor speed and likewise, vehicle speed. Thus the acceleration of the vehicle is a direct function of the pressure applied to the foot pedal 4 by the operator since the volume of flow of hydraulic pressure fluid in the system is a direct function of the variable orifice control valve V while the pump pressure is a direct function of the motor demand.

In the arrangement of FIGURE 11 when the 4-way directional valve is positioned in a neutral or no-flow position by the centering of the control switch 210 therefor obviously no pressure fluid can flow to or from the wheel motors and accordingly the vehicle is thereby held immobilized.

From the above description and disclosure it should be appreciated that there is herein described, disclosed, illustrated and shown, various embodiments or modifications of a novel system, method, arrangement or apparatus for the propulsion of powered vehicles of any type, whether land, or amphibious, wheeled or endless track types driven by means of a hydraulic fluid pressure transmission system employing hydraulic pumps and motors, which are variously of either the variable or fixed displacement types providing infinitely variable speeds and torque ratios over wide ranges, and all directly under the control of the operator and the energy demands required of the propulsion system.

While the invention has been described, disclosed, illustrated and shown in terms of certain preferred embodiments or modifications which it has assumed in practice, the scope of the invention should not be deemed to be limited by the precise certain embodiments or modifications herein shown, described, illustrated and disclosed, such other embodiments or modifications being intended to be reserved as they fall within the scope of the claims hereto appended.

What I claim is:

1. A hydraulic drive transmission system comprising in combination with an engine having a throttle means, manually operable means including adjustable pressure fluid control valve means, said manually operable means being operably connected to and controlling said engine throttle means, hydraulic pump means directly driven by said engine and operable to place hydraulic fluid under pressure, hydraulic propulsion motor means, at least one of said hydraulic pump and motor means being of the normal minimum flow variable displacement type having displacement control means, conduit means hydraulically connecting said motor means with said hydraulic pump means for actuation thereby, the flow of pressure fluid in said conduit means being responsive to said manually operable pressure fluid control valve means, selective directional flow valve means for controlling flow and the direction of flow of fluid to said hydraulic motor means, a normally open bypass valve means in hydraulic communication with said conduit means selectively permitting and preventing the flow of fluid from said pump means to said hydraulic motor means, a separate control circuit means including means operable for controlling said directional fluid flow control valves means, said bypass valve means being actuated to closed position by said manually operable means during initial actuation thereof to direct fluid flow from said pump means to said motor means.

2. A hydraulic drive transmission system as defined in claim 1 wherein said separate control circuit comprises the engine ignition electrical circuit including engine ignition switch means, said switch means for said directional fluid flow control valve means and said engine ignition switch means being connected in series relation.

3. A hydraulic drive trasmission system as defined in claim 2 comprising a hydraulic fluid reservoir, said pump having a fluid intake connection with said reservoir, fluid return conduit means from said motor means to said reservoir, said normally open bypass valve means being disposed in said pressure fluid conduit means and connected with said reservoir, pressure-responsive valve means in said pressure conduit means and responsive to a relative drop in fluid pressure in any of said hydraulic motor means to substantially cut-off flow of pressure fluid thereto until conditions causing said relative drop in pressure are overcome.

4. A hydraulic drive transmission system as defined in claim 1 wherein said manually operable means comprises a fluid pressure creating unit, both said hydraulic pump means and said hydraulic motor means hydraulically connected thereto being of the normal minimum variable displacement type having displacement control means the torque in said motor means being a direct function of pump pressure and the pressure of the pump discharge adjusting its own displacement as a direct function of the demand of the motor means, said displacement mechanisms of said pump means and said motor means having hydraulic connection with said manually operable fluid pressure creating means, normally closed fluid flow cutoff valve means in said last mentioned hydraulic connections, means to open said cutoff valve means, said bypass valve means being moved to said closed position by the fluid pressure created in said manual fluid pressure creating means.

5. A hydraulic drive transmission as defined in claim 4 wherein a reservoir supplies hydraulic fluid to said pump means, said bypass valve means and said motor means have hydraulic connection with said reservoir, said normal minimum variable displacement hydraulic motor means comprises a plurality of fluid motors, each of said motors being adapted to be built in to the member driven thereby, electrical circuit means, said directional fluid flow valve means and said cutoff valve means being electrically actuated by said electrical circuit, manually operable separate switch means for said directional fluid flow valve means and said cutoff valve means in said electrical circuit, said separate switch means being connected in parallel with respect to each other, pressure-responsive valve means in said pressure fluid conduit means and responsive to a relative drop in fluid pressure in any of said motors to substantially cutoff flow of pressure fluid thereto until conditions causing said relative drop in pressure are overcome.

6. A hydraulic drive transmission as defined in claim 5 wherein said electrical circuit means comprises the ignition circuit of said engine, an engine ignition switch in said circuit, said parallelly connected separate switch means being connected in series with said ignition switch.

7. A hydraulic drive transmission as defined in claim 6 wherein said parallelly connected separate switch means include double throw three position switches for controlling fluid flow through said directional flow valve means.

8. A hydraulic drive transmission system comprising in combination with an engine preferably of the turbine type having a throttle means, manually operable means including fluid pressure creating means, said manually operable means being hydraulically connected to and controlling said throttle means, hydraulic pump means directly driven by said engine, hydraulic propulsion motor means, at least one of said hydraulic pump and motor means being of the normal minimum flow variable displacement type having displacement control means responsive to said manually operable pressure creating means, pressure fluid conduit means hydraulically connecting said pump means to said motor means, the flow in said conduit means being responsive to said manually operable fluid pressure creating means, electrically actuated and manually controlled directional flow control valve means in said pressure fluid conduit means for controlling the flow and direction of flow of pressure fluid to said hydraulic motor means, normally open and electrically closable bypass valve means in fluid communication with said pressure fluid conduit means selectively permitting and preventing fluid flow to said hydraulic motor means, electrical engine ignition circuit means including an ignition switch, said electric circuit including parallelly connected separate switches operative to actuate said directional flow control valve means, said bypass valve means switch means being actuated by initial operation of said manually operable means, said parallelly connected separate switches being in series connection with said ignition switch.

9. A hydraulic drive transmission system as defined in claim 8 wherein both said pump means and motor means are of the normal minimum flow variable displacement type having adjustable displacement control means, said manually operative fluid pressure creating means being also hydraulically connected to the displacement mechanism of both said pump and motor means, electrically actuated normally closed valve means in the hydraulic connection between said manual fluid pressure creating means and said motor displacement means, manually operable switch means in said electrical circuit means for controlling said last mentioned valve means, pressure-responsive valve means in said pressure fluid conduit means and responsive to a relative drop in fluid pressure in any of said motor means to substantially cutoff flow of pressure fluid thereto until conditions causing said relative drop in pressure are overcome.

10. A hydraulic drive transmission as defined in claim 9, wherein said transmission includes a hydraulic fluid reservoir, said manually operable fluid pressure creating means including a combined pressure piston and valve means, said conduit means including branch conduit means connecting said manually operable pressure creating means and the hydraulic pump means to said reservoir, said combined piston and valve means cutting off pressure fluid flow through said branch conduit when said piston valve means is manually moved to hydraulically actuate said engine throttle means whereby pressure fluid flows from said pump means towards said individual motor means, return fluid flow conduit means connecting said motor means and said manually controlled directional flow control valve means with said reservoir.

11. A hydraulic drive transmission as defined in claim 4 wherein said hydraulic pump means comprises a fixed displacement pump whereby the rate of discharge thereof is responsive solely to the speed of the engine and indirectly to the pressure of the fluid in said manually operable fluid pressure creating means.

12. A hydraulic drive transmission as defined in claim 11 wherein said hydraulic propulsion motor means comprises a plurality of normal minimum flow variable displacement motors, hydraulic fluid reservoir means, said reservoir means supplying fluid to said hydraulic pump, return flow conduit means connecting said plurality of hydraulic motors to said reservoir, said bypass valve means in said pressure fluid conduit means having shunt connection with said return flow conduit means, excess pressure release valve means having shunt connection between said pressure fluid conduit means and said return flow conduit means in parallel flow relation to said bypass valve means whereby on sudden acceleration of said engine creating excessive pressure in said pump means the pressure fluid will be shunted directly to said reservoir.

13. A hydraulic drive transmission as defined in claim 4 wherein said hydraulic propulsion motor means comprises a pair of fixed displacement hydraulic motors, the driving torque of said motors being a direct function of pump pressure, said electrically actuated manually controlled directional fluid flow valve means including a separate valve unit for each of said pair of motors, a reservoir connected to said hydraulic pump means and said pair of hydraulic motors and said bypass valve means whereby the pump means and motors under predetermined conditions can selectively function as the driving hydraulic means the motors functioning as brake units.

14. A hydraulic transmission as defined in claim 13 wherein said connection between said reservoir and said motors comprise return fluid flow conduit means, a pair of functionally parallel shunt conduit connections between said pressure fluid conduit means and return fluid flow conduit means, said bypass valve means being located in one of said shunt conduit connections, and excess pressure release valve means being located in the other of said shunt conduit connection.

15. A hydraulic drive transmission system comprising in combination with a turbine type prime mover having throttle means, manually operable pedal means linked to said throttle means for control of said prime mover, fluid pressure creating means directly responsive to movement of said pedal means, normal minimum flow variable displacement pump means having displacement control means and driven by said prime mover, said displacement control means of said pump means being directly responsive to said manually operable fluid pressure creating means, normal minimum flow variable displacement motor means having hydraulic pressure fluid connection to the discharge of said pump means whereby said pump means hydraulically drives said motor means said hydraulic connection with said pump discharge being also hydraulically connected to the displacement control means of said motor means whereby the driving torque of said motor means is a direct function of pump pressure, 4-way directional flow and cutoff valve means in said pressure fluid connection to said motor means whereby the flow and direction of flow of pressure fluid through said motor means can be selectively controlled, orifice cutoff valve means in said hydraulic connection to the displacement control means of said motor means, both said 4-way directional flow and cutoff valve means and said orifice cutoff valve means being electrically controlled by manual controlled switch means.

16. A hydraulic drive transmission system as defined in claim 15 in combination with a vehicle having at least four ground wheels wherein said motor means comprises at least four normally minimum flow variable displacement motors each driving one of said wheels, pressure responsive valve means in said hydraulic pressure fluid connection intermediate pairs of said wheel motors and responsive to a relative drop in fluid pressure in either pair of wheel driving motors to substantially cutoff flow of pressure fluid thereto until conditions causing said relative drop in pressure are overcome, electrical circuit means including an ignition switch for said prime mover, separate 3-position switch means in said electrical circuit means for each of said directional valve means for said motor separate single pole switch means in said electrical circuit means for controlling said orifice cutoff valve means, said 3-position switch means and said single pole switch means for each of said motors being connected in series relation with said ignition switch and in parallel relation to each other.

17. A hydraulic drive transmission system as defined in claim 16 wherein additional pressure responsive valve means are provided in the pressure fluid connection between the wheel motors of each of said pairs and responsive to a relative drop in fluid pressure in either motor of each pair to substantially cut off flow of pressure fluid thereto until conditions causing said relative pressure drops are overcome.

18. A hydraulic drive transmission system as defined in claim 17 further including a hydraulic fluid reservoir conduit means connecting said reservoir to said pump means and to said motors for supplying fluid to said pump means and receiving fluid from said motors, excess pressure release valve means in said pressure fluid connection between said pump discharge and said motors, remotely controlled bypass valve means also in said pressure fluid connection, both said excess pressure release valve means and said remotely controlled bypass valve means opening to said reservoir.

19. A hydraulic drive transmission system as defined in claim 18 including means in said electrical circuit actuated by initial movement of said manually operable pedal means closing said bypass valve means.

20. A hydraulic drive transmission system comprising in combination with a turbine type prime mover having throttle means, manually operable pedal means linked to said throttle means for control of said prime mover, fluid pressure creating means directly responsive to actuation of said pedal means, normal minimum flow variable displacement pump means having displacement control means and directly driven by said prime mover, normal minimum flow variable displacement motor means having hydraulic pressure fluid connection with the discharge of said pump means whereby said pump means hydraulically drives said motor means, said hydraulic pressure fluid connection with the discharge of said pump means having hydraulic connection with the displacement control mechanism of said pump means whereby said pump adjusts its own displacement mechanism as a direct function of the demand of the motor means, said pedal-actuated fluid pressure creating means having fluid pressure connection with the displacement control means of said motor means, normally closed fluid flow cutoff valve means in said fluid pressure connection between said pedal-actuated fluid pressure creating means and said motor means, reservoir means supplying hydraulic fluid to said pump means and receiving fluid from said motor means, bypass valve means in said hydraulic pressure fluid connection between said pump and motor means, said bypass valve means opening to said reservoir, said bypass valve means having fluid pressure connection with said pedal-actuated pressure creating means whereby said bypass valve means is closed during initial actuation of said pressure creating means.

21. A hydraulic drive transmission system as defined in claim 20 wherein said hydraulic connection between said pump means and said motor means include valve means selectively controlling flow and the direction of flow of pressure fluid from said pump means to said motor means, electrical circuit means, means in said electrical circuit means for controlling said selective flow controlling valve means and said normally closed cutoff valve means in said fluid pressure connection between said pedal-actuated fluid pressure creating means and said motor means, said last mentioned means being connected in parallel in said electrical circuit means.

22. A hydraulic drive transmission as defined in claim 21 wherein said motor means comprises a plurality of normally minimum flow variable displacement hydraulic motors, said selective flow controlling valve means comprising a plurality thereof each one of which controls pressure fluid flow to each of said hydraulic motors, pressure responsive valve means in said hydraulic pressure fluid connection between the discharge of said pump means and said motors, said pressure responsive valve means being responsive to a relative drop in pressure in any of said motors to substantially cut off flow of pressure fluid thereto until conditions causing said relative drop in pressure are overcome.

23. A hydraulic drive transmission system comprising in combination with a turbine type prime mover having throttle means, manually operable pedal means linked to said throttle means variable orifice fluid flow control means directly responsive to said pedal means, normal minimum variable displacement pump means driven by said prime mover, hydraulic motor means having pressure fluid connection with and hydraulically driven by said pump means said variable orifice volume flow control means being mounted in said pressure fluid connection and controlling the volume of pressure fluid flow from said pump means to said motor means, branch conduit means connecting said displacement control means of said pump means with said pressure fluid connection intermediate said variable orifice volume control means and said motor means whereby the discharge pressure of said pump means is a direct function of motor demand, a hydraulic fluid reservoir, said reservoir supplying pressure fluid to said pump means and receiving fluid from said motor means, bypass valve means mounted in said hydraulic pressure fluid connection between said pump means and said motor means, said bypass valve being connected with said reservoir, and means responsive to initial depression of said pedal means for closing said bypass valve means to said reservoir.

24. A hydraulic drive transmission system as defined in claim 23 having a valve means selectively controlling flow and the direction of flow of pressure fluid from said pump to said motor means mounted in said pressure fluid connection between said pump means and motor means and intermediate said branch conduit connection therewith and said motor means, electric circuit means including 3-positional switch means for actuating and controlling said selective directional control valve means said means for closing said bypass valve means including one-directional switch means in said electrical circuit means.

25. A hydraulic drive transmission system as defined in claim 24 wherein said motor means comprises a plurality of hydraulic motors, said electrical circuit means comprising the engine ignition circuit, engine ignition switch means, said 3-positional switch means and said single pole switch means being in parallel connection with each other and in series connection with said ignition switch means in said ignition circuit.

26. A hydraulic drive transmission system as defined in claim 25 in combination with a vehicle having a plurality of rotatably propelled members, said hydraulic motors being adapted to be mounted within and forming a component of said rotatably propelled members, pressure responsive valve means in said hydraulic pressure fluid connection between the discharge of said pump means and said motors, said pressure responsive valve means being responsive to a relative drop in pressure in any of said motors to substantially cut off flow of pressure fluid thereto until conditions causing said relative drop in pressure are overcome.

27. A hydraulic drive transmission system comprising in combination with an engine having throttle means,
  manually operable means comprising adjustable pressure fluid control means,
  said manually operable means being operably connected to the engine throttle means for controlling the engine throttle means,
  hydraulic pump means directly driven by said engine and operable to place hydraulic fluid under pressure,
  a plurality of hydraulic propulsion motor means,
  each of said motor means being of the normal minimum flow variable displacement type having displacement control means,
  conduit means hydraulically connecting said motor means with said pump means for actuation thereby,
  the flow of pressure fluid in said conduit means being responsive to said manually operable pressure fluid control means,
  selective directional flow valve means for controlling the flow and the direction of flow of fluid to said hydraulic motor means,
  normally open bypass valve means selectively permitting and preventing the flow of fluid from said pump means to said motor means,
  said bypass valve means being actuated to closed position by said manually operable means during initial actuation thereof to direct fluid flow from said pump means to said motor means,
  control conduit means operatively connecting said pressure fluid control means to each of said displacement control means,
  cutoff valve means in said control conduit means operable to selectively render said displacement control means non-responsive to said manually operable means, and
  separate control circuit means having means for controlling said directional fluid flow control valve means and said cutoff valve means.

28. The hydraulic drive transmission system as set forth in claim 27 wherein
  the hydraulic pump means and the hydraulic motor means are each of the normally minimum flow variable displacement type having displacement control means.

29. A hydraulic drive transmission system comprising in combination with an engine preferably of the turbine type having throttle means,
  hydraulic pump means directly driven by said engine and operable to place hydraulic fluid under pressure,
  hydraulic propulsion motor means,
  at least one of said hydraulic pump means and said hydraulic motor means being of the normal minimum flow variable displacement type having displacement control means,
  conduit means hydraulically connecting said motor means with said pump means for actuation thereby, and
  manually operable means having adjustable pressure fluid control valve means and normally open bypass valve means,
  said manually operable means being operably connected to the engine throttle means and controlling the engine throttle means,
  said normally open bypass valve means being operably connected to and in fluid communication with said conduit means to selectively permit and prevent the flow of fluid from said pump means to said motor means,
  said bypass valve means being actuated to closed position by said manually operable means during initial actuation thereof to direct fluid flow from said hydraulic pump means to said hydraulic motor means,
  said adjustable pressure fluid control means being operably connected to the displacement control means and controlling the displacement control means.

30. The hydraulic drive transmission system as set forth in claim 29 wherein
  said adjustable pressure fluid control means is operably connected to both the engine throttle means and said displacement control means for controlling both the engine throttle means and said displacement control means.

31. The hydraulic drive transmission system as set forth in claim 29 wherein
  said manually operable means comprises,
  a cylinder having a bore,
  fluid inlet and fluid outlet means communicating with said bore,
  an end port communicating with one end portion of said bore,
  a control piston slidably movable within said bore,
  a foot pedal for controlling said control piston,
  said control piston having a pressure piston portion and a control valve portion,
  said piston portion of the control piston forming a pressure chamber within said bore in fluid communication with said end port,
  said pressure chamber being fluidly connected to the engine throttle means and said displacement control means for controlling the engine throttle means and the displacement control means, and said control valve portion of the control piston being arranged to cooperate with said inlet and said outlet port means to function as normally open bypass valve means selectively permitting and preventing the flow of fluid from said pump means to said hydraulic motor means and being actuated to closed position by initial actuation of said control piston by said foot pedal.

References Cited by the Examiner

UNITED STATES PATENTS

| | | | |
|---|---|---|---|
| 1,259,090 | 3/1918 | Ferris et al. | 60—19 |
| 2,500,580 | 3/1950 | Segsworth | 60—19 |
| 2,518,578 | 8/1950 | Tomlinson. | |
| 2,547,578 | 4/1951 | Holmes | 180—66 |
| 2,774,434 | 12/1956 | Ferris | 180—6.3 |
| 2,942,421 | 6/1960 | Hann et al. | 60—19 |
| 3,059,416 | 10/1962 | Campbell | 180—66 X |
| 3,078,656 | 2/1963 | Jedrzykowski | 180—66 X |
| 3,110,152 | 11/1963 | Johnson | 60—19 X |
| 3,114,424 | 12/1963 | Voreaux et al. | 180—66 X |
| 3,153,908 | 10/1964 | Lawrence | 60—53 |

FOREIGN PATENTS 628,201    8/1949    Great Britain.

BENJAMIN HERSH, *Primary Examiner.*

A. HARRY LEVY, *Examiner.*

M. L. SMITH, *Assistant Examiner.*